(12) United States Patent
Stanley

(10) Patent No.: US 10,151,660 B2
(45) Date of Patent: Dec. 11, 2018

(54) BALANCE OPPOSITION COMPARATOR

(71) Applicant: Ronald Frank Stanley, Silver Lake, WI (US)

(72) Inventor: Ronald Frank Stanley, Silver Lake, WI (US)

( * ) Notice: Subject to any disclaimer, the term of this patent is extended or adjusted under 35 U.S.C. 154(b) by 156 days.

(21) Appl. No.: 14/057,799

(22) Filed: Oct. 18, 2013

(65) Prior Publication Data

US 2015/0107375 A1    Apr. 23, 2015

(51) Int. Cl.
*G01M 1/12* (2006.01)
*G01M 1/14* (2006.01)

(52) U.S. Cl.
CPC ............. *G01M 1/122* (2013.01); *G01M 1/14* (2013.01)

(58) Field of Classification Search
CPC .......... G01G 1/02; G01M 1/122; G01M 1/14; G01L 5/00; G01B 5/0023
USPC ................. 73/862.61, 65.01, 65.03; 177/216
See application file for complete search history.

(56) References Cited

U.S. PATENT DOCUMENTS

| | | | | |
|---|---|---|---|---|
| 3,677,356 A * | 7/1972 | Goodwin | ...................... | 177/190 |
| 4,043,184 A * | 8/1977 | Sayers | ......................... | 73/65.03 |
| 4,246,756 A * | 1/1981 | West | ............................... | 60/640 |
| 4,389,049 A * | 6/1983 | Wiley | ...................... | 273/153 R |
| 4,747,314 A * | 5/1988 | Huang | ...................... | 73/862.452 |
| 5,277,059 A * | 1/1994 | Chastonay | .............. | A63B 60/42 |
| | | | | 473/292 |
| 5,685,192 A * | 11/1997 | Shriner et al. | ..................... | 73/73 |
| 5,927,989 A * | 7/1999 | Kung et al. | ................... | 434/194 |
| 6,521,847 B1 * | 2/2003 | Ostermann | ................... | 177/134 |
| 6,637,265 B1 * | 10/2003 | Hay et al. | ........................ | 73/433 |
| 6,718,832 B1 * | 4/2004 | Hay et al. | ........................ | 73/790 |
| 6,765,156 B2 * | 7/2004 | Latiri | ............................ | 177/171 |
| 8,435,162 B1 * | 5/2013 | Al-Oboudi | ....................... | 482/97 |
| 2004/0048696 A1 * | 3/2004 | Ciesar | ................. | A63B 69/0002 |
| | | | | 473/457 |
| 2006/0215813 A1 * | 9/2006 | Scherch | ............... | A61N 5/1049 |
| | | | | 378/65 |

* cited by examiner

*Primary Examiner* — Max Noori
(74) *Attorney, Agent, or Firm* — Dale J. Ream

(57) ABSTRACT

A tennis player needs multiple playing racquets available for their use, and the mass proportions of every racquet in their bag needs to match, otherwise players will likely experience a degradation of their swing mechanics, BOC provides an accurate measurement of player racquets mass proportions by comparator testing of any 2 racquets, thus providing a simplified solution for accurate measurement, and then equalization process of player racquets mass proportions.

1 Claim, 3 Drawing Sheets

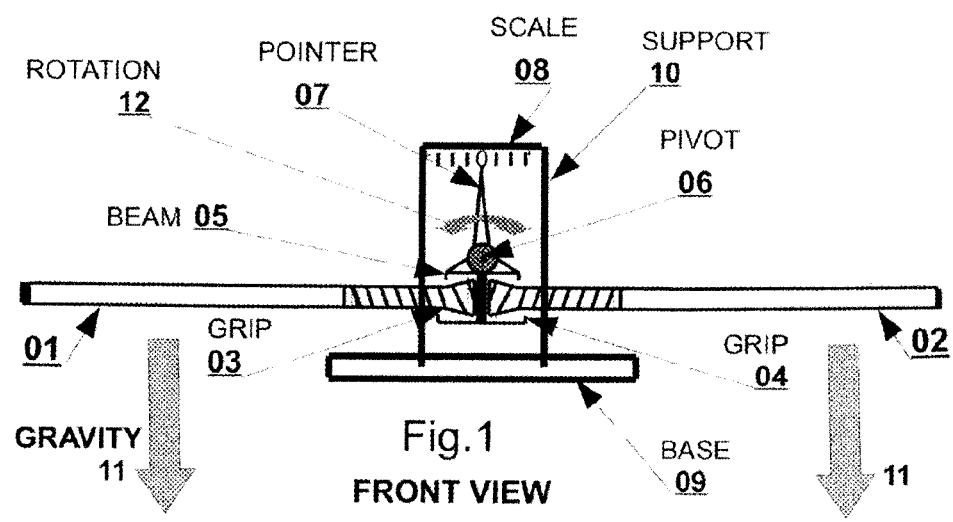
Fig. 1 FRONT VIEW

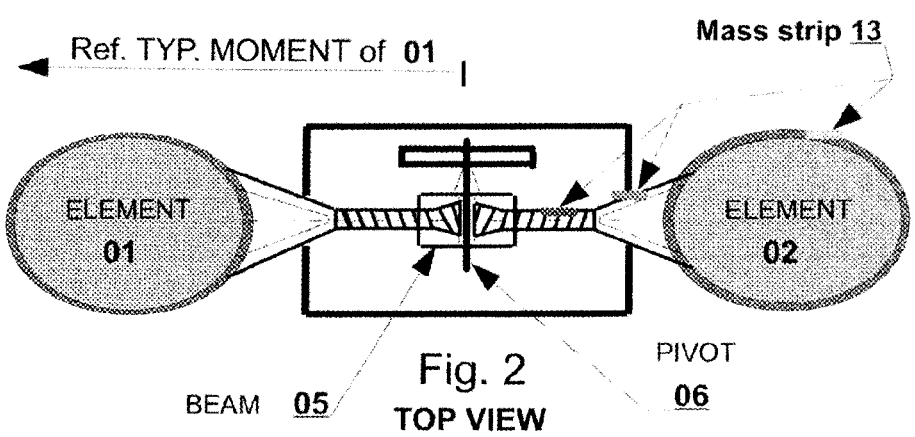

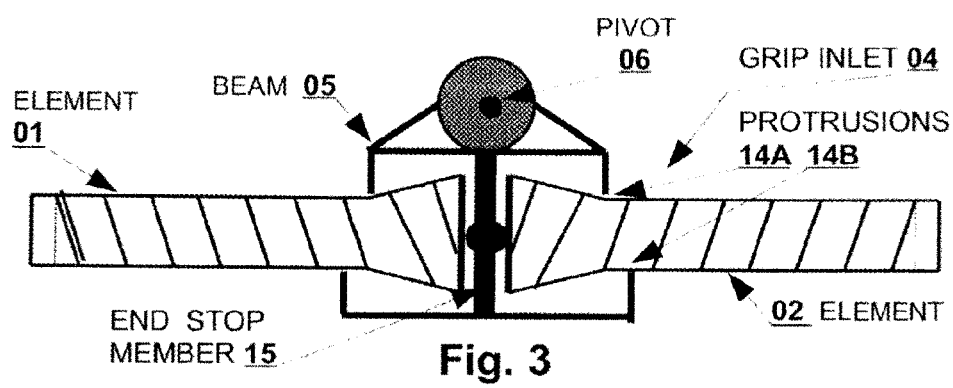

BALANCE OPPOSITION COMPARATOR

FIELD

Racquet balance adjustment scale Mass moments measurement scale Quality Control tool Base ball Bat proportions measure Golf club swing mass scale

FACTOR

A perfect for use: Tennis racquet/Golf club/Ball bat/etc. requires proper proportional balance/mass distribution to perform properly.

FURTHER

Typically manufactured racquets/etc. rarely meet their exact intended proportional balance specifications at sale due to MFG. build tolerances so consumers end up with many deficient for use racquets/etc. that need some degree of mass proportion modification to be perfectly balanced for use.

STATE OF THE ART

With current tools it is fairly impossible to determine the mass distribution of within a tennis racquets frame/etc. other than perhaps X RAY or MRI of cross section. Estimates can be made using a basic balance board or dynamic swing weight scale or total mass can be measured on digital scale again this will not indicate exactly where massive areas are located. Where any racquet is more or less massive within it's frame is not possible to measure directly.

PRIOR ART

Some other inventions for the measurement of swing weight in golf clubs have been introduced and are currently available from RALPH MALTBY and KENITH SMITH They also use gravity force motive in a mass balance system that uses a weight bias movable slide mounted on a pivotable beam with an engraved measurement scale used as a variable swing mass reference to then balance against as it is opposed by the mass-moment of a golf club griped to and laying perpendicular to gravity at distal end of pivot-able beam having central pivot. The device calibration gives a swing wt. figure when balanced as a final measurement. A tennis related similar use scale is a simple balance board having a raised horizontal pivot rod that the tested objects frame lays atop and object then moved sideways until a balance position is found where it remains in horizontal plane point of balance can then be measured. Also electronic swing wt. devices by Babolat and Prince MFG. co. can perform swing mass measure within some tolerance +− accuracy unknown but whatever it is likely it will not be as accurate as direct comparison measurement or as easy to confirm accurate swing matching from one frame to another frame or to make the small mass adjustments required for matching with an active indicator scale or modify a swing mass balance toward an exact match with the preferred balance of a reference massive object/racquet/etc. These noted inventions while similar in some function are not comparators of mass proportions so they can not directly determine swing mass matching of one mass-moment object directly compared against a similar reference mass-moment object.

RELATED REF. USA PATENTS

U.S. Pat. Nos. 5,721,399 4,043,184 4,747,314 4,415,156 3,698,239 3,577,771

A typical weight comparator scale only compares an objects center mass no size proportions or moments are measured so our scale by its unique tested object mounting configuration does much more interrogation of a tested objects massive proportion quantities.

BOC scale orients the tested objects length/maximum moments perpendicular with gravity so that all the infinite individual moments of included mass will all be measured as one gravity motive force then said one force is compared to a tested $2^{nd}$ objects one force as placed in opposition then both 2 forces counteract in beam assembly causing each tested objects equal forces to cancel out the others leaving either no force acting to rotate beam or some differential force that acts to cause beam rotation angularity that's relative to some massive mismatch between the 2 tested objects massive proportions.

Moreover BOC Indicates static swing mass moments of sports implements/Racquets/Clubs/Bats/etc., via comparison to a reference object having a known quantity mass-moment said ref. object is opposed mounted to counteract with the tested $2^{nd}$ massive object resulting in any as equal counter-forces nullification then if both tested massive objects were of equal mass-moments scale will indicate on center force equality and since you know the reference objects massive quantities you now know the tested $2^{nd}$ objects mass quantities as well swing mass/mass proportions/total mass. Furthermore: in above if there were instead some non countered differential mass forces remaining after nullification of all equal opposed forces they would cause an unbalanced rotational condition and pointer would indicate +− out of center scale meaning tested $2^{nd}$ object mass proportions do not match the reference object then one can make some adjustments to mass proportions on tested $2^{nd}$ objects frame to bring scale reading toward center scale where both objects would finally read as equal.

BOC Plan:

Provides that during comparison testing you can match the 2 tested objects massive proportions more specific you can match your favorite balanced feel racquet/bat/etc./your well balanced massive implement of choice and then you have replicated extra copies of your favorite each being the exact same proportional feel and exact same mass quantities.

Functional Use:

Ref. Drawing FIG. 1 $16^{th}$ Pg.: A Reference; swing-able proportion massive object/element-01 is $1^{st}$ mounted into the left distal grip-03 end into stop member-15 of beam-05 in direct opposition to a similar object the tested $2^{nd}$ mass element-02 that is then equally mounted at opposed side into the right distal grip-04 end to other side stop member-15 of said common mount pivot-able beam-05 that having a center pivot axle-06 located central between said grips 03 & 04 then both tested massive elements-01 & 02 are poised in opposition each on a distal side grip-03 & 04 of beam-05 then each tested mass-01 & 02 imposes an individual gravity motive-11 each is a counteracting force on the pivot-able beam-05 so that if any differential of counter forces is residual after all equal but opposed forces have canceled each other out any such residual force will cause some degree of beam-05 rotation then attached pointer-07 indicates rotation-12 measured as inequality of mass-01 & 02 and then indicated on scale-08 as +− out off center thus indicating some mass adjustments need to be made to $2^{nd}$ tested object-02 if a match is to be had with the ref. $1^{st}$ object-01. [per our plan] Further; in above If the tested $2^{nd}$ mass element-02 had been of equal massive proportion as ref. $1^{st}$ mass Element-01 then No differential forces would exist after both equal massive objects-01 & 02 gravity motive forces each canceled out the other against pivot-able beam-05 that then has no angular rotation so that scale-08 will read as on center indicating that both tested elements-01 & 02 have an equal massive proportion same total mass and identical swing mass.

Plan Matching Adjustments:

Note:

Prior to doing any measurement on BOC you need to measure both your test racquet's for total weight and balance then you may need to adjust $2^{nd}$ racquet's balance to be closer to the same as your ref. $1^{st}$ favorite racquet but still keeping total wt. of $2^{nd}$ racquet a fraction oz. less than favorite ref. $1^{St}$ racq. so that some fractional oz. metal wt. strips can latter be added to the frame of unmatched $2^{nd}$ racquet during final mass proportions adjustment.

Then using your total weight measurement figures that you recorded for both test racquets per accurate digital measure. You calculate weight difference between your 2 test racquets Then this calculated difference weight amount will be added to the lighter $2^{nd}$ racquet in the form of metal strips placed on along frames moment. Placement will be trial & error until pointer moves toward and finally reads on center scale.

Setup:

Adjust mounting base to level scale pointer should read exact on center.

Plan:

By drw. ref. Pointer-07 moving past Scale-08 will indicate degrees +− off center scale of any mismatch between tested elements-01 & 02 this guides the user by pointer deflections toward a solution for the mismatch.

The match adjustments are made by placement of small mass strips in trial areas-13 along element-02 moment of frame until pointer-07 moves toward a final reading of on center of scale-08. Then all mass proportions of Elements-01 & 02 are matched. As said the amount of mass required for matching in above plan will be the difference weight E01-E02=Dw you calculated based on your prior recorded total weights measured on each element-01 & 02.

Measured Using Accurate Digital Scale

Ref. Massive Element Options:

Tennis Racquets Golf clubs Ball bats etc., could be tested based on your individual requirements.

Construction of Scale:

Can be accomplished using any of a variety of materials wood plastic metal etc. BOC Scale simple form will have a table mountable wood base support plate 09 with an attached vertical wood support member 10 that will hold a protruding horizontal metal pivot axle 06 that will support a formed metal pivot-able beam support assy. 05 axle at center and said beam having 2 grip inlets 03 & 04 each with 2 parallel protrusions 14A & 14B and an end stop member 15 that will locate a tested objects handle end then attached to beam 05 a plastic pointer 07 to measure any rotation against stator scale 08 located on mtg. support 10.

DESCRIPTION OF DRAWING EMBODIMENTS
FIG. 1 2 3

FIG. 1 shows BOC invention front view with 2 for test massive objects mounted in preferred test configuration as opposed horizontally into and extending from each of beams 2 grips each grip located at a distal opposed side of central located pivot-able beam allowing the relative force of each tested object to be compared and scaled as a function of each objects mass gravity force counteracting with the others.

FIG. 2 shows top view of the same objects as in FIG. 1 for reference perspective and also shows suggested potential placements for making mass adjustments using small metal strips when BOC is used for mass moment matching of the 2 tested objects.

FIG. 3 shows unique construction details of pivot-able beam partial central side view the handle ends of 2 tested objects are shown in preferred mounting configuration each 1 placed into its 3 griping protrusions that align the objects for testing function each set of 3 griping protrusions being poised at a distal beam side and symmetrical about the beams pivot each distal grip protrusion set is holding an opposing massive tested object handle in a horizontal perpendicular with gravity position as required for this mass moment comparison testing.

DETAILED DESCRIPTION OF EMBODIMENTS:
DRAWING REFERENCE

Usage:

2 of Massive test Elements 01E & 02E are required for all functional use

Element Options:

2 of Racquets/Clubs/Bats/etc.; Sports Implement objects

Operational Details:

See Drawing pg. 1/1 $16^{th}$ pg. FIG. 1 for Reference

Setup:

Adjust mounting base to level scale pointer should read exact on center.

Drw. FIG. 1:

Tested 2 massive elements 01 & 02 are each placed into either opposed grip area 03 or 04 each handle end against center stop member 15 each grip located on a distal side 03 & 04 of pivot-able support beam 05 each element 01 & 02 having a certain mass-moment gravity force 11 may cause pivot-able beam 05 to rotate 12 position about its centered pivot support axle shaft 06 if any difference of massive gravity force 11 exists between the 2_tested elements 01 & 02 within pivot-able beam system 05 then pointer 07 attached to beam 05 will indicate any rotation 12 magnitude on scale 08 but will indicate on center at scale 08 if both 2 tested elements 01 & 02 have mass-moment proportion equality.

Claim, a BOC apparatus for measuring comparative mass moments of 2 massive object handles, comprised of: a stationary vertical mounting base, attached a specially designed pivot-able beam having centered pivot axle, and having a means to indicate it's rotation angularity, also each distal side of pivot-able beam outward from center pivot axle, has an inlet grip, each loaded for testing with one massive object handle laying horizontal, thus both are perpendicular to gravity and opposed for comparison testing, angularity indicator will show any differential in mass moments present between these 2 tested massive object handles as rotational degrees off normal horizontal, alternately when no rotation is indicated, the 2 massive object handles then have identical mass moments.

It is understood the invention as described is not limited to this sole embodiment described herein, but encompasses any scope of within the claims.

I claim:
1. A balance opposition comparator apparatus for measuring comparative mass moments of two massive handles, comprising:
- a stationary vertical base structure pivotally coupled to a beam;
- an angle indicator configured to measure an angularity of said beam;
- a pair of inlet grips configured to retain the two massive handles, respectively, each inlet grip located on a distal side of the beam, each inlet grip being equidistant from a center pivot axle of the beam;
- wherein the two massive handles are gripped and laying horizontal when loaded into respective inlet grips for testing and are equally exposed to gravity forces acting perpendicular thereto for comparator testing;
- wherein any differential in mass moments present between the two massive handles causes pivotal rotation of the beam;
- wherein the degree of angularity is indicative of the magnitude of unequal mass moments present between the two gripped massive handles and when no differential of mass moments detected between the two massive handles, the beam will remain in a normal horizontal position.

* * * * *